US006179398B1

United States Patent
Martin

(10) Patent No.: US 6,179,398 B1
(45) Date of Patent: Jan. 30, 2001

(54) CORNER PIECE AND CABINET FRAME

(76) Inventor: Michael Alan Martin, 6 Twin Brooks Rd., Salisbury, MA (US) 01952

( * ) Notice: Under 35 U.S.C. 154(b), the term of this patent shall be extended for 0 days.

(21) Appl. No.: 09/239,846

(22) Filed: Jan. 29, 1999

(51) Int. Cl.[7] .................................................. A47G 29/00
(52) U.S. Cl. .................................... 312/265.4; 312/223.1; 403/170; 403/217
(58) Field of Search ..................................... 403/169, 176, 403/170, 172, 231, 217, 288; 312/223.2, 265.1, 265.4; 411/399, 187

(56) References Cited

U.S. PATENT DOCUMENTS

| | | | |
|---|---|---|---|
| 3,044,656 | * 7/1962 | Combs et al. | 312/265.1 |
| 5,516,225 | * 5/1996 | Kvols | 312/265.1 |

FOREIGN PATENT DOCUMENTS

| | | | |
|---|---|---|---|
| 249642 | 2/1964 | (AU) | 312/265.4 |
| 2310583 | * 9/1974 | (DE) | 312/265.4 |

OTHER PUBLICATIONS

Everest Electronic Equipment, Inc., "4000 Series Vertical Cabinets," fifteen page brochure older than one year.
Apex PC Solutions, Inc., "Dense Pack," five–page brochure excerpt, 1997.
Damac Products, Inc., "Cabinet Solutions Catalog," five page brochure excerpt, Jan. 1998.
PFT Co., three page brochure excerpt, older than one year.
Devtek Electronics Packaging Systems, ten page brochure excerpt, 1994.

\* cited by examiner

Primary Examiner—Peter M. Cuomo
Assistant Examiner—Jerry A. Anderson
(74) Attorney, Agent, or Firm—Francis L. Conte

(57) ABSTRACT

A corner piece is configured for rigidly joining together a pair of beams to form a frame. A main body includes a pair of pegs diverging outwardly therefrom for being inserted in corresponding sockets in respective ends of the beams. The body includes a crotch laterally separating the pegs at an inside corner for engaging the beams. The crotch permits inside welding to the corner piece. And, in a preferred embodiment, a corner bezel extends from the body to define an outside corner, and a corner seat is disposed in the body for receiving a gasket.

25 Claims, 5 Drawing Sheets

CORNER PIECE AND CABINET FRAME

BACKGROUND OF THE INVENTION

The present invention relates generally to storage cabinets, and, more specifically, to cabinets for storing electrical equipment.

Electrical equipment is often stored in vertical cabinets or enclosures for the protection thereof during operation. For example, a computer network typically includes a central computer server which is hardwired to multiple computer terminals at remote locations. The server typically includes associated equipment such as magnetic storage disks or tapes. The electrical equipment is preferably stored in one or more cabinets having suitable access therein for routing the various electrical wires thereto.

The storage cabinets are typically closed on all six sides using front and rear doors and removable side panels. The doors or panels may be formed of metal or transparent material as desired and may include ventilation louvers. The cabinets have sufficient rigidity and strength for supporting the weight of the components therein. A typical cabinet includes structural front and rear frames or bezels which are joined together by four or more cross ties to define a rectangular box. The bezels and cross ties are typically metal extrusions having hollow cross sections of various configurations for functional and aesthetic reasons.

The frame bezels are typically formed of straight aluminum extrusions which are miter cut at their ends and welded completely around the corresponding miter joints to provide a suitable load rating for the resulting cabinet. However, this manufacturing process requires accurate miters and corresponding assembly fixtures therefor, with full miter welding for achieving the desired load rating. Since welding locally melts the extrusion, the resulting weld bead is distorted and affects the visual appearance of the cabinet. Accordingly, the welds are typically smoothed by sanding or grinding for achieving a pleasing appearance thereat.

In many cabinets, the doors and panels require suitable sealing with the frame for protection against dust, moisture, electro-magnetic interference (EMI), and radio frequency interference (RFI). Dust and moisture protection is typically provided using a flexible seal around the perimeters of the frame openings. And, EMI and RFI shielding is typically effected by forming the entire cabinet including its frame, doors, and panels out of metal, and including a metallic gasket around each of the frame openings in which the panels and doors are mounted.

Gaskets are typically applied using an adhesive on the backs thereof which bonds the gaskets to corresponding flat seats around the cabinet openings. The gaskets may be cut to length and joined end-to-end which affects the ability to obtain a complete seal without interruption.

Accordingly, it is desired to provide an improved cabinet construction for simplifying assembly while maintaining strength and sealing capability.

BRIEF SUMMARY OF THE INVENTION

A corner piece is configured for rigidly joining together a pair of beams to form a frame. A main body includes a pair of pegs diverging outwardly therefrom for being inserted in corresponding sockets in respective ends of the beams. The body includes a crotch laterally separating the pegs at an inside corner for engaging the beams. The crotch permits inside welding, brazing, or bonding to the corner piece. And, in a preferred embodiment, a corner bezel extends from the body to define an outside corner, and a corner seat is disposed in the body for receiving a gasket.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
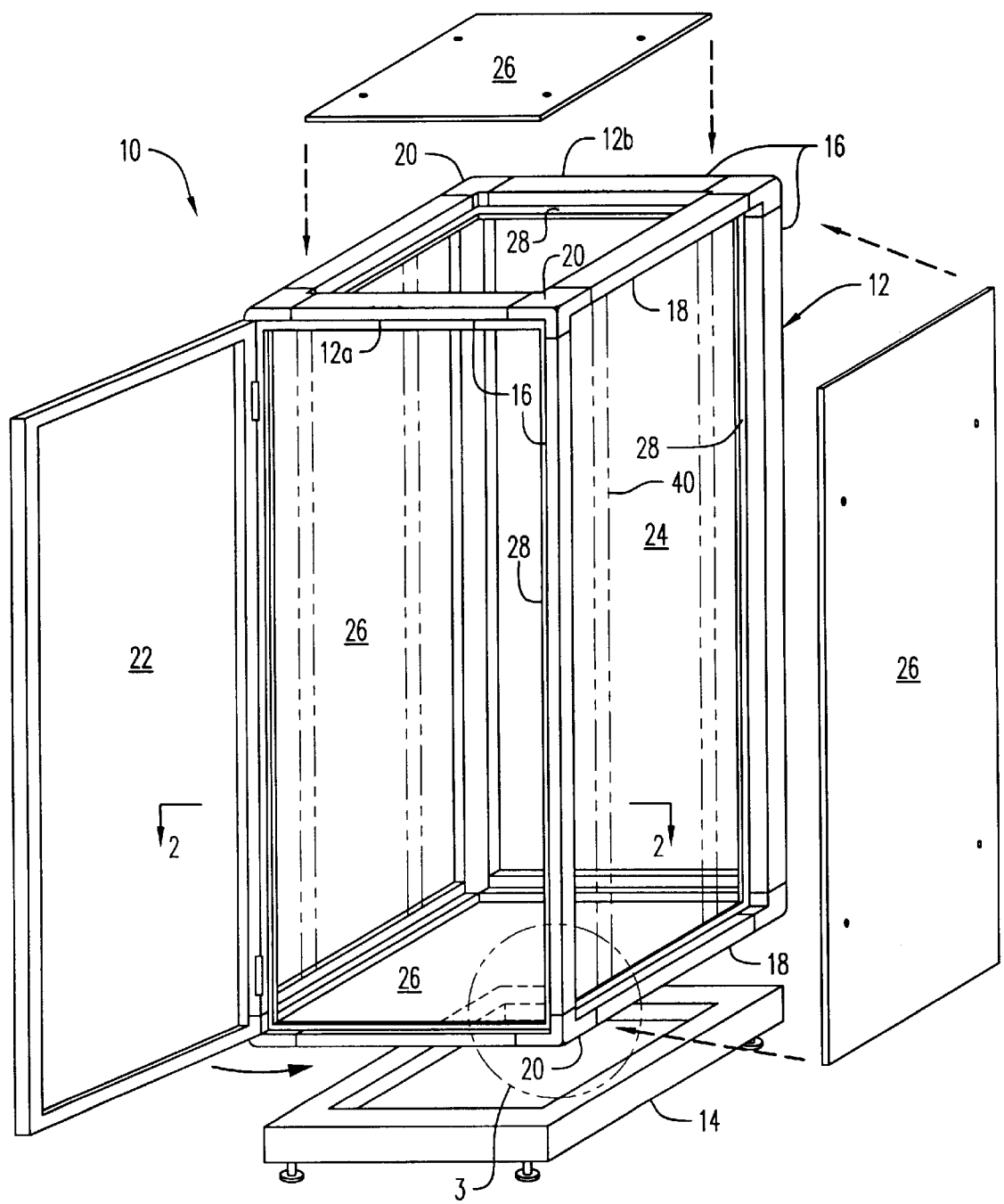
FIG. 1 is a partly exploded, isometric view of a storage cabinet having a frame in accordance with an exemplary embodiment of the present invention.

Illustrated in FIG. 1 is an enclosure or cabinet 10 for storing therein one or more pieces of electrical equipment such as computer servers and related equipment (not shown). The cabinet includes a frame 12 configured in accordance with the present invention which may be supported atop a conventional base 14.

The frame 12 includes a plurality of straight beams 16 and a plurality of straight cross ties 18 fixedly joined to a corresponding plurality of corner pieces 20, simply referred to as corners 20. Four of the beams 16 and corners 20 are joined together to define a front frame or bezel 12a having a rectangular opening therein. Four more of the beams 16 and respective corners 20 are joined together to define a rear frame or bezel 12b, and corresponding rectangular opening therein. And, four cross ties 18 fixedly join together the front and rear bezels 12a,b at corresponding corners 20 thereof to define corresponding rectangular openings at the bottom, top, and two sides of the frame 12, for a total of six openings.

A front door 22 is conventionally hinged to the front bezel 12a. A rear door 24 is conventionally hinged to the rear bezel 12b. And, top, bottom, and side panels 26 are affixed to the beams and cross ties defining the four rectangular openings between the front and rear bezels 12a,b.

The doors and panels may take any conventional form and material such as metal or plastic for example. The doors may be formed with their own extruded metal frames with corresponding panels mounted thereto. The door panels may be transparent or translucent as desired for viewing the equipment stored within the cabinet if desired.

Figure 2:
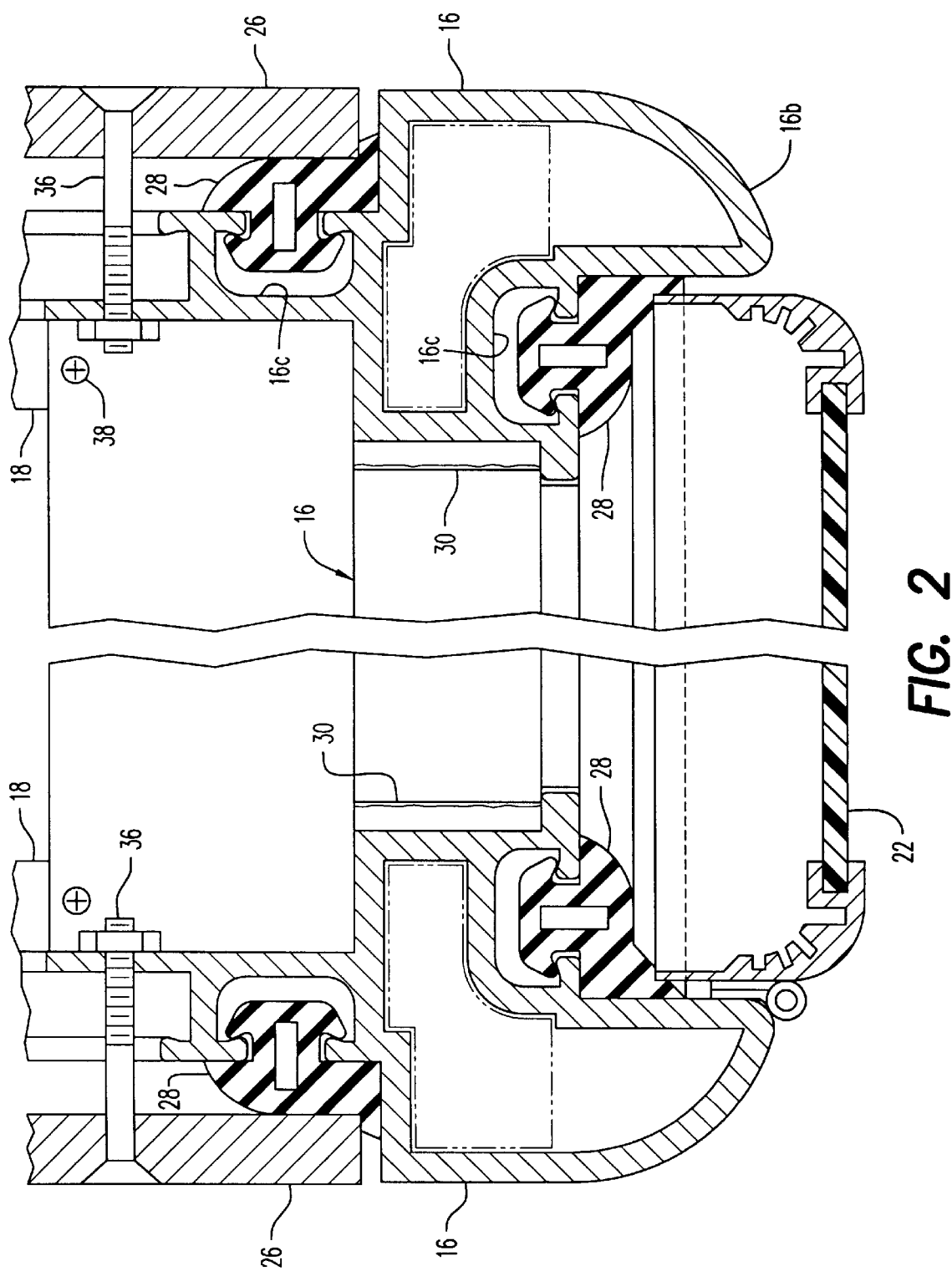
FIG. 2 is a transverse sectional view through a front portion of the cabinet illustrated in FIG. 1 and taken along line 2—2.

Eight corner pieces 20 are used as structural elements for joining together the two sets of four beams 16 and the corresponding four cross ties 18 to define the rectangular frame 12 of the cabinet. This construction has benefits in manufacture and assembly of the cabinet, and also permits improved sealing of the doors and panels to the frame using corresponding resilient gaskets 28. As shown in FIG. 2, the gaskets 28 extend around the perimeter of the rectangular openings and are engaged in compression by the corresponding panels and doors for providing effective seals thereat.

Figure 3:
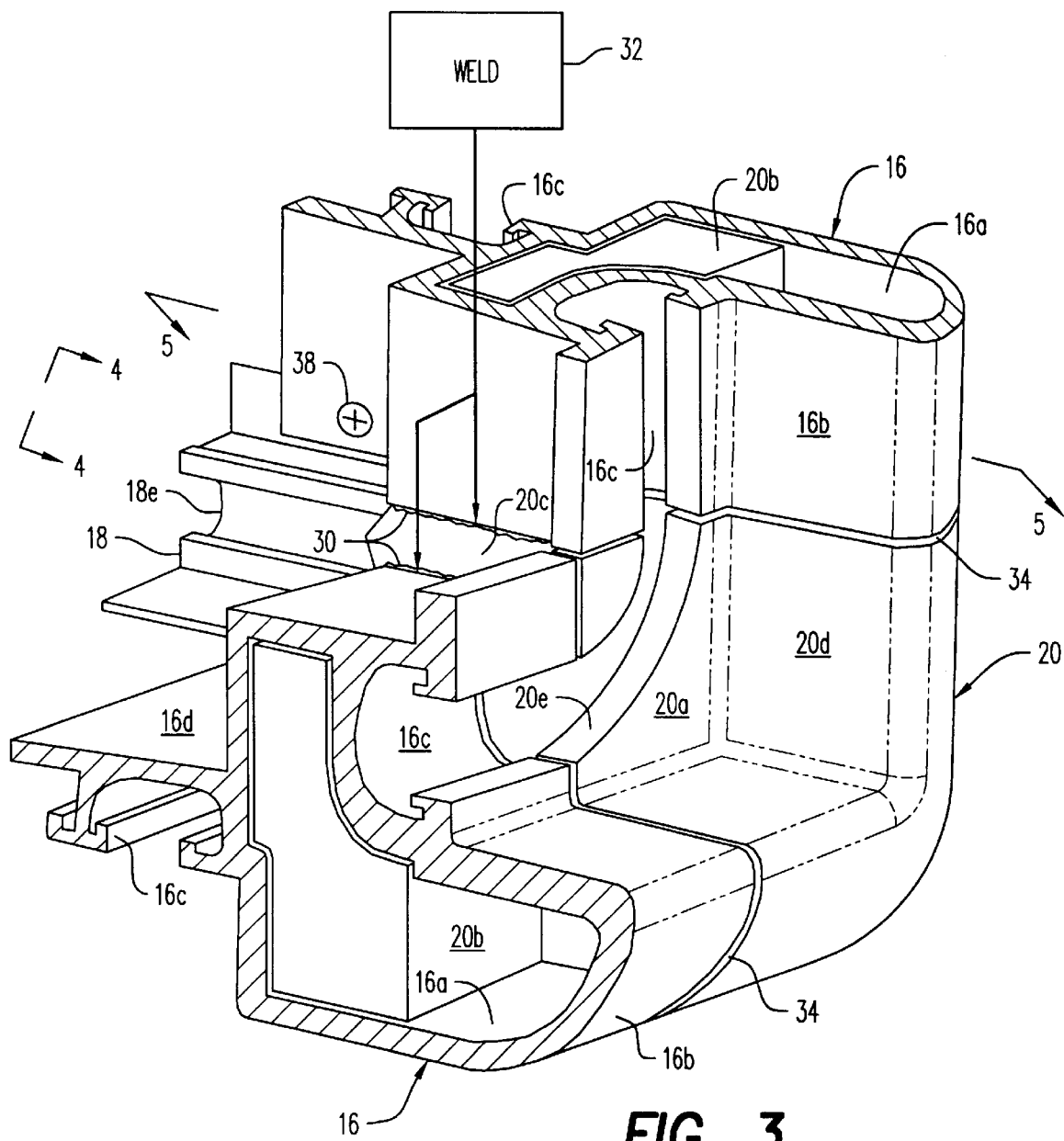
FIG. 3 is an enlarged, partly sectional isometric view of an exemplary corner piece joining a pair of beams and cooperating cross tie for each of the eight corners illustrated in the cabinet of FIG. 1, as represented by the exemplary corner shown within the dashed circle labeled 3.
Figure 4:
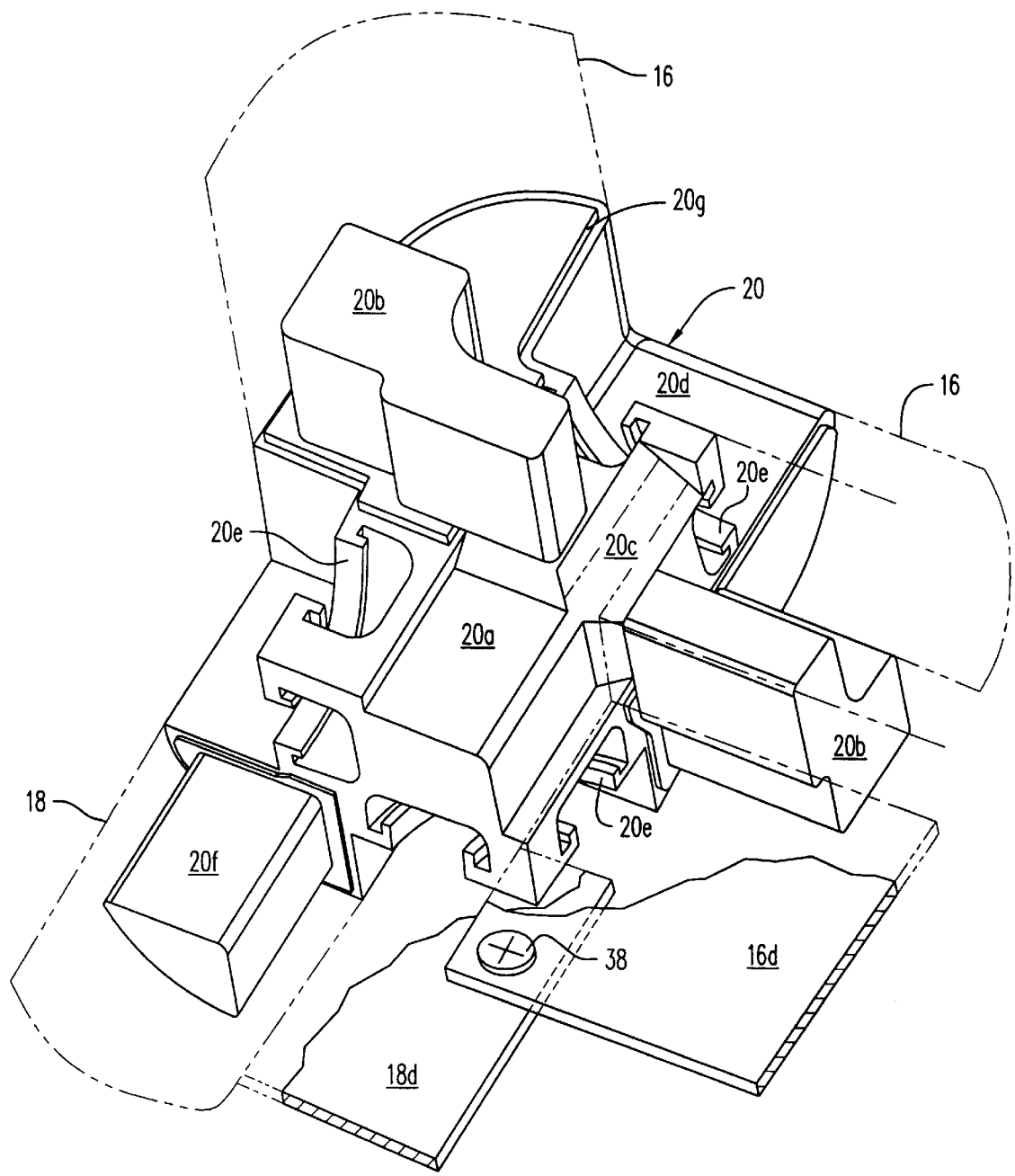
FIG. 4 is an isometric view of the corner piece illustrated in FIG. 3 isolated from the attached beams and cross tie and taken generally along line 4—4.

The eight corner pieces 20 illustrated in FIG. 1 are preferably identical to each other and are unitary or one-piece members such as formed by casting. FIG. 3 illustrates an exemplary form of one of the corner pieces 20 attached to corresponding ends of a pair of beams 16 and cross tie 18, and FIG. 4 illustrates the corner piece 20 in isolation for clarity of presentation. In both FIGS. 3 and 4, the gaskets 28 illustrated in FIGS. 1 and 2 have been removed also for clarity of presentation.

Referring initially to FIG. 4, each corner piece 20 includes a main body 20a having a pair of main stubs or pegs 20b which extend or diverge outwardly therefrom preferably perpendicularly or 90° from each other. The pegs are sized and configured for being inserted in corresponding sockets 16a in respective opposite ends of the beam 16 as illustrated in FIG. 3. In view of the relatively complex configuration of the beams, they are typically formed as hollow extrusions, such as aluminum, with the socket 16a extending the full length of the beams.

As shown in FIGS. 3 and 4, the body 20a includes a crotch 20c in the form of a flat land laterally separating the two pegs 20b at an inside corner for engaging in abutment corresponding distal ends of the adjoining beams 16.

In the exemplary embodiment illustrated, the two pegs 20b are perpendicular to each other, and the crotch 20c extends obliquely at about 45° therebetween for engaging both beams while preferably leaving an exposed space therebetween. The pair of beams 16 are preferably welded to the corner piece 20 at the crotch 20c thusly forming corresponding weld beads 30 thereat, which may also be a common weld bead. The beams may alternatively be brazed, or bonded, or even mechanically joined to the corner pieces as desired for load rating and rigidity.

The corner pegs 20b are preferably sized and configured to match the available space within the beam sockets 16a in a snug fit. In this way, the beams may be simply cut to the required length with a square, un-mitered end cut for engaging corresponding corner pegs 20b in an axial slip fit. The four beams 16 of the front bezel 12a may thusly be initially assembled with four of the corner pieces 20 which provide self-fixturing thereof.

A conventional welder 32 as illustrated schematically in FIG. 3 may then be used for welding the corresponding beams at the respective crotches 20c which fixedly joins together the entire front bezel 12a in a rigid assembly having significant load carrying capability. The weld beads 30 lock the beams to respective corner pieces 20, with the snug fit of the respective pegs 20b and corresponding beam sockets 16a providing strong joints with considerable bending rigidity. In this way, the beams need only be welded or affixed to the corner pieces at the corresponding crotches 20c, with the remainder of the joints therebetween being preferably unwelded.

This construction and assembly method not only simplifies the frame, but reduces cost thereof, and eliminates the need for additional processing to grind or sand smooth the weld joints. The weld beads 30 are substantially hidden from view within the inside corner of the corner pieces and do not require any post smoothing operation.

As initially shown in FIG. 4, the corner piece 20 further includes a solid corner bezel 20d integrally joined to the main body 20a and defining an outside corner. The corner bezel extends along at least two sides of the main body and is disposed perpendicularly outwardly from the two pegs 20b. The corner bezel stops short of the two pegs along their axial length to permit the attachment to the corresponding beams 16 as illustrated in FIG. 3.

As shown in FIG. 3, the corner bezel 20d may have any suitable profile for both adding structural rigidity to the corner as well as for aesthetic purposes. For example, the two perpendicular legs of the corner bezel preferably have flat intersecting inner surfaces and arcuate, convex outer surfaces forming a contoured bullnose. The main body 20a of the corner piece preferably also includes an inside corner seat 20e disposed at the root of the corner bezel between the bezel and the crotch 20c for receiving a portion of the gasket 28, omitted for clarity in FIG. 3 but illustrated in FIGS. 1 and 2.

Although the corner seat may be flat, in the preferred embodiment illustrated in FIG. 3 it is recessed into the body to define a corresponding slot or channel which extends between the two pegs 20b. The corner seat 20e may have any suitable sectional profile, such as the T-shape profile illustrated, which is effective for trapping or retaining the gasket 28 having a complementary T-shaped dovetail root.

In the preferred embodiment, the corner seat 20e is arcuate or concave along the corner bezel 20d for providing a continuous channel between the two perpendicular pegs 20b to provide a continuous pathway for the gasket as it bends around each of the corners for continuing along the attached beams 16.

As initially shown in the FIG. 3, each of the beams 16 includes a corresponding beam bezel 16b extending between the opposite ends of the beam, and configured to match the profile of the corner bezels 20d to which it adjoins. Each beam also includes a beam seat 16c which extends straight between the beam opposite ends and matches in profile the corner seat 20e, and is thusly recessed in the preferred T-profile.

Accordingly, when the four beams 16 are joined to the corresponding four corner pieces 20, the corresponding beam seats 16c and corner seats 20e are aligned together end-to-end to form a continuous seat around the perimeter of the four-sided assembly. In this way, a corresponding gasket 28, as illustrated in FIGS. 1 and 2, may be press fit into the gasket seats for retention therein and for providing a common plane against which the front door 22 may engage for providing an effective seal around its entire perimeter. The gasket 28 may be a continuous one-piece annular member, or may be cut from a strip in one or more sections with abutting end gaps when assembled into the gasket seat around the full perimeter of the cabinet opening.

The corner pieces 20 not only provide self-fixturing for the beams during the assembly and welding process, but also provide substantial strength, and continuity for mounting the gasket continuously around each corner. The gasket 28 may be a simple elastomeric material for providing a seal against moisture and dust upon closure of the abutting door. The gasket may also have a woven metallic skin for providing EMI and RFI shielding when used with a metallic door in abutment thereagainst. Since the circumferentially continuous gasket seat in the beams and corner pieces permits the use of a circumferentially continuous gasket 28, a circumferentially continuous seal may be maintained around the full perimeter of each frame opening when closed by the corresponding doors, or panels as described in more detail hereinbelow.

As indicated above, the corner pieces 20 are preferably solid for strength, and are preferably castings, of aluminum for example, in view of the complex three dimensional configuration. The corresponding beams 16 are preferably hollow, and preferably formed as extrusions, of aluminum for example, in view of their corresponding complex shape, with the end sockets 16a thereof simply being defined at the corresponding ends of the hollow beams.

As shown in FIG. 3, the corner pegs 20b are preferably configured in profile to underlie the corresponding beam seats 16c as well as bound these seats along the outboard sides thereof. The corner pegs 20b therefore have a configuration of two rectangles intersecting along common sides thereof with a slight offset. The hollow beams 16 are therefore configured to match the profile of the corner pegs 20b to form a snug fit therewith, with the beam bezels 16b being hollow and empty.

The opposite ends of the beam 16 are preferably square cut, or perpendicular to the longitudinal axes thereof, for adjoining the corresponding legs of the corner bezels 20d upon engagement with the corner pegs 20b. In a preferred embodiment, the beam bezels 16b are longitudinally spaced from the corner bezels 20d to define respective gaps 34 therebetween. The gaps 34 are preferably empty without attachment between the beams and corner pieces. Since most of each gap 34 is visible from outside the cabinet, they may be used to advantage to provide clean and uniform corner joints which do not require labor-intensive post processing.

For example, if the gaps 34 were welded, they would require suitable smoothing by grinding or sanding to provide a pleasing surface finish. By not welding the gaps 34, smoothing thereof is not required, with strength of the corners being instead effected by the assembled corner piece and beams in welding only at the crotches 20c which are hidden from view.

The gaps may be formed in any suitable manner such as by using a temporary shim between the abutting ends of the bezel portions of the beams and corner pieces during welding, which are removed thereafter. Or, the crotch 20c may protrude slightly at each peg 20b to prevent the beam ends from contacting the corner bezel.

In the preferred embodiment, the gaps 34 are formed by providing a corner step 20g around the perimeter of the corner bezels 20d where they abut the bezels of the beams and cross ties. In this way, the corner bezels 20d provide a raised land against which the beams and cross ties may abut, leaving precise gaps 34 exposed to view at the steps 20g.

As shown in FIG. 1, the front frame bezel 12a is defined by the four beams 16 and connected corner pieces 20, with the bezel portions 16b and 20d collectively defining the full rectangular perimeter bezel thereof. The front door 22 may then be joined to the front frame 12a using two or more hinges in any conventional manner. The rear frame bezel 12b may be substantially identical to the front frame 12a for similarly mounting the rear door 24, or a fixed panel if desired.

Since both the front and rear frames 12a,b are preferably welded assemblies, they provide the primary strength and load carrying capability for the cabinet 10. The two frames may then be joined together using the cross ties 18 for defining a six sided frame to which the panels and doors may be attached for completing the cabinet.

Figure 5:
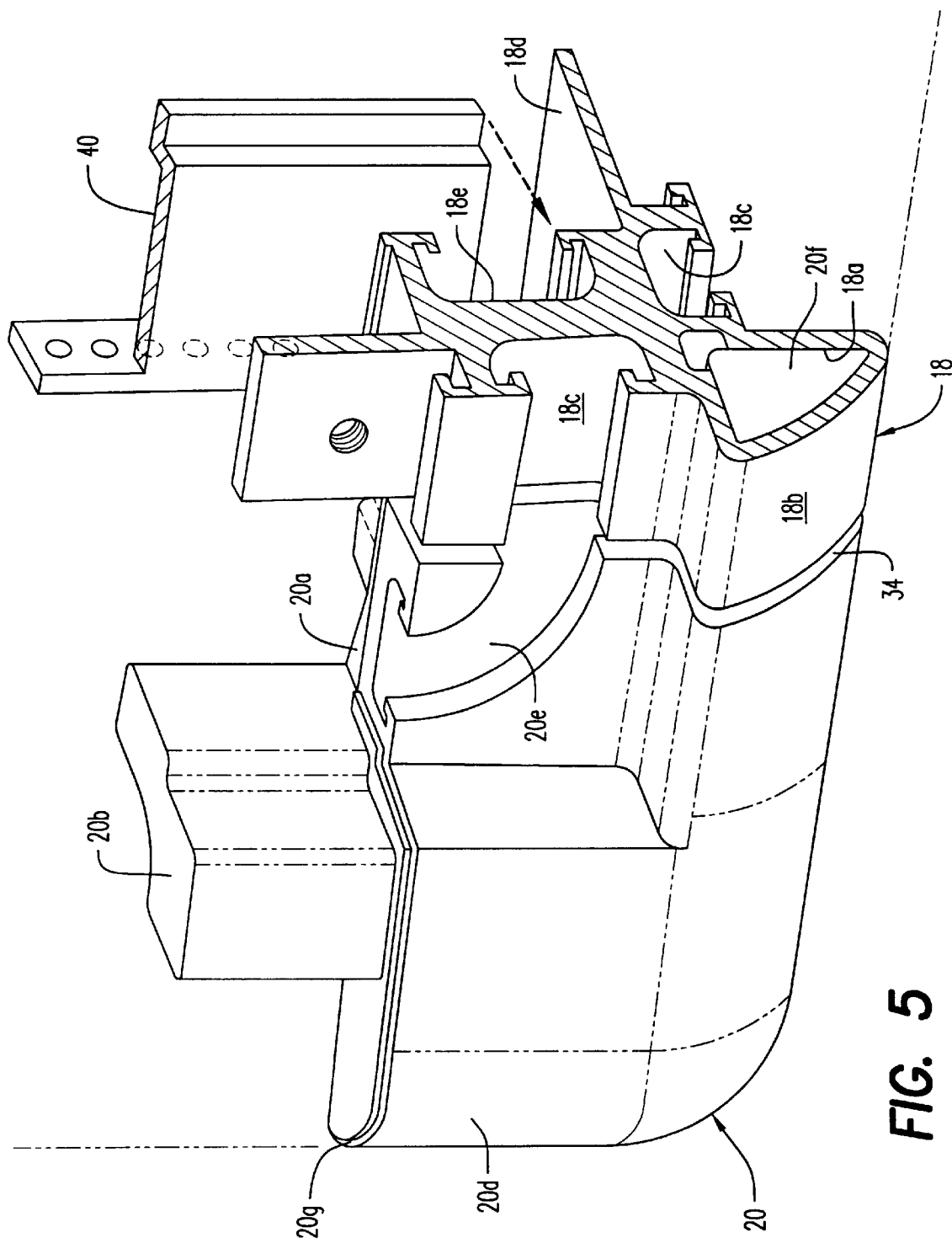
FIG. 5 is an isometric view of the corner piece illustrated in FIG. 3 shown from a side thereof and taken generally along the line 5—5.

As initially shown in FIG. 4, each corner piece 20 preferably also includes a third or cross peg 20f disposed orthogonally with the two main corner pegs 20b in the unitary casting for being inserted in a respective socket 18a in a corresponding one of the opposite ends of the cross ties 18 as shown in more detail in FIG. 5.

In this configuration, the corner bezel 20d extends in three orthogonal directions toward each of the three pegs 20b,f to define a three dimensional outside corner. Correspondingly, the main body 20a of each corner piece includes three of the corner seats 20e bridging respective pairs of the three pegs as shown best in FIG. 4.

Each of the cross ties 18, as illustrated in FIG. 5 for example, preferably includes a matching bezel 18b to continue the bullnose of the corner piece bezel 20d at a corresponding end gap 34. The cross peg 20f is generally triangular in cross section in the form of a quarter-round bullnose for matching the profile of the cross tie bezel 18b in which it is inserted.

Furthermore, each cross tie 18 also includes a recessed channel or seat 18c extending between the opposite ends thereof, with each cross tie seat 18c matching a corresponding corner seat 20e of the corner piece for providing a continuous gasket channel therewith.

As shown in FIG. 1, the four cross ties 18 join together the front and rear frames 12a,b to define respective bottom, top, and two rectangular side bezels and corresponding openings therein which are substantially identical to those of the front and rear frames. In this way, the four panels 26 may be attached to the corresponding openings for fully enclosing and sealing the cabinet. As shown in FIG. 2 for example, respective ones of the gaskets 28 are disposed in the corresponding seats around each of the six openings of the cabinet for engaging in abutment the corresponding doors and panels.

Whereas the doors may be hinged to the cabinet, the panels 26 may be attached thereto in any suitable manner such as using internal or external screw fasteners 36 as shown in FIG. 2 which extend through suitable flange portions of the beams or cross ties as desired. The corresponding panels 26 compress the gaskets 28 against their seats for providing continuous, full-perimeter, seals therealong, with the panels 26 being preferably mounted flush with the corresponding bezels of the beams and cross ties.

Whereas the beams 16 are preferably welded to the corresponding corner pieces 20 at the crotches 20c thereof, the cross ties 18 are preferably mechanically joined to the adjoining beam 16 using suitable screw fasteners 38 as shown in FIG. 4 for example. Both the beams 16 and the cross ties 18 have corresponding flat flanges 16d and 18d which overlap behind the corresponding corner pieces and through which the fasteners 38 may be joined. If desired, the cross ties 18 could be otherwise fixedly joined to the corner pieces and beams in any suitable manner including welding or brazing.

As shown in FIG. 4, each corner piece 20 includes three of the corner seats 20e for matching and continuing the respective gasket seats of the beams and cross ties. As shown in FIG. 3, each of the beams 16 includes two of the gasket seats 16c therein, with one seat being adjacent the bezel 16b, and one being disposed on the outboard side of the flange 16d. As shown in FIG. 5, each of the cross ties 18 also includes two gasket seats 18c facing outboard on both sides of the bezel 18b. In this way, corresponding gasket seats may be defined around the full perimeters of each of the six sides of the cabinet for providing complete seals with the abutting panels and doors.

As shown in FIG. 3, the corner seat 20e is defined on its inboard side by a post extension of the crotch 20c having a triangular head which is coplanar with the mouth of the seat 20e. The crotch head adjoins respective portions of the gasket seats in the beams and cross ties. The respective gasket seats are thusly recessed from a common flat plane along both sides thereof which supports the exposed portion of the gasket, while retaining the gasket root within the T-channels on both sides thereof continuously around the corner pieces to the adjoining beams and cross ties.

As shown in FIG. 5, each of the cross ties 18 preferably also includes a recessed slot 18e extending between the opposite ends thereof. The slot 18e may be configured like the two gasket seats 18c and is disposed therebehind for providing a convenient location for adjustably securing vertical mounting rails 40 thereto. The mounting rails 40 may have any suitable configuration and typically include rows of apertures thereon for mounting shelves within the cabinet for supporting the equipment therein. The rails 40 may be conveniently attached to the mounting slots 18e using conventional screws and spring nuts secured thereto. The spring nuts may be mounted within the slot 18e and are positionable at any location along the length thereof for suitably locating the various mounting rails 40 as desired for configuring the inside of the cabinet.

As indicated above, the corner pieces 20 provide a convenient manner for joining together the respective beams and cross ties initially in a mechanical self-fixturing manner. Upon welding of the beams to the corner pieces, rigid frames are effected, with the fastened cross ties providing suitable rigidity for the entire six sided frame. The three pegs of each corner piece are hidden within the respective sockets of the beams and cross ties and improve the mechanical strength thereof, with the corresponding bezels being exposed to view.

The gasket seats are formed in the corresponding corner pieces, beams, and cross ties at the roots of the bezel portions thereof to provide common planes along which the gaskets may be mounted by simple entrapment within the seat channels. Full perimeter sealing of the respective doors and panels is thusly effected for providing a fully enclosed cabinet sealed against moisture, dust, EMI, and RFI using correspondingly configured gaskets.

The assembly of the components is relatively simple, and requires welding only along the corresponding corner crotches 20c, with the remainder of the gaps being otherwise unwelded or unjoined. This presents a clean profile without requiring further sanding or grinding operations for reducing manufacturing costs while providing a pleasing appearance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A cabinet corner piece for rigidly joining a pair of beams and cross tie to form a frame comprising:
   a body having three pegs including a pair of pegs and a third peg diverging outwardly therefrom for being inserted in corresponding sockets in respective ends of said beams and cross tie; and
   a crotch disposed in said body and laterally separating said pair of pegs at an inside corner for welding said beams at said crotch, and said crotch extends obliquely between said pair of pegs for engaging said beams with an exposed land therebetween for welding said beams thereto.

2. A corner piece according to claim 1 wherein said pair of pegs are perpendicular to each other.

3. A corner piece according to claim 2 further comprising:
   a corner bezel integrally joined to said body, and defining an outside corner extending perpendicular to said pair of pegs; and
   a corner seat disposed in said body between said bezel and crotch for receiving a gasket.

4. A corner piece according to claim 3 wherein said corner seat is recessed in said body, and extends between said pair of pegs.

5. A corner piece according to claim 4 wherein said corner seat is arcuate along said corner bezel.

6. A corner piece according to claim 5 wherein said third peg is disposed orthogonally with said peg pair for being inserted in a socket in an end of said cross tie.

7. A corner piece according to claim 6 wherein:
   said corner bezel extends in three orthogonal directions toward each of said three pegs to define a three dimensional outside corner; and
   said body includes three of said corner seats bridging respective pairs of said three pegs.

8. A frame comprising:
   a plurality of beams and cross ties each having sockets at opposite ends thereof;
   a plurality of corner pieces joining respective pairs of said beams to define a rectangular opening; and
   each of said corner pieces including:
      a body having three pegs including a pair of pegs and a third peg diverging outwardly therefrom for being inserted in corresponding sockets in respective ends of said beams and cross ties; and
      a crotch disposed in said body and laterally separating said pair of pegs at an inside corner for welding said beams at said crotch, and said crotch extends obliquely between said pair of pegs for engaging said beams with an exposed land therebetween for welding said beams thereto.

9. A frame according to claim 8 wherein:
   said pegs of each corner piece are perpendicular to each other, and said crotch extends obliquely therebetween to engage respective pairs of said beams at said exposed land therebetween; and
   said beam pairs are welded to said crotches.

10. A frame according to claim 9 wherein each of said corner pieces further comprises:
   a corner bezel integrally joined to said body, and defining an outside corner extending perpendicular to said pair of pegs; and
   a corner seat disposed in said body between said bezel and crotch and receiving a gasket.

11. A frame according to claim 10 wherein said corner seats are recessed in said bodies, and extend between said pair of pegs thereof.

12. A frame according to claim 11 wherein said corner seats are arcuate along said corner bezels.

13. A frame according to claim 12 wherein each of said beams further comprises:
   a beam bezel extending between said beam opposite ends, and matching said corner bezel;
   a recessed beam seat extending between said beam opposite ends, and matching said corner seat; and
   said gasket extends continuously along said corner seat and adjoining beam seat.

14. A frame according to claim 13 wherein:

said corner pieces are solid; and said beams are hollow, with said end sockets receiving respective ones of said pair of pegs.

15. A frame according to claim 14 wherein said beam bezels are spaced from said corner bezels to define respective gaps therebetween.

16. A frame according to claim 14 wherein:

four of said beams and corner pieces are joined together to define a front bezel;

an additional four of said beams and corner pieces are joined together to define a rear bezel; and four of said cross ties join together said front and rear bezels at said respective third pegs thereof to define respective bottom, top, and two side bezels and openings therein.

17. A frame according to claim 16 wherein:

each of said corner bezels extends in three orthogonal directions toward each of said three pegs to define a three dimensional outside corner;

each of said bodies includes three of said corner seats bridging respective pairs of said three pegs;

each of said cross ties includes a recessed seat extending between said opposite ends thereof;

each of said corner seats matches said respective seats from said beams and cross ties to define continuous channels; and respective ones of said gaskets are disposed in said seats around each of said six openings.

18. A frame according to claim 17 defining a cabinet further comprising:

a front door hinged to said front bezel to engage said gasket therein;

a rear door hinged to said rear bezel to engage said gasket therein;

a top panel affixed to said top bezel to engage said gasket therein;

a bottom panel affixed to said bottom bezel to engage said gasket therein; and a pair of side panels affixed to said side bezels to engage said gaskets therein.

19. A frame according to claim 17 wherein each of said cross ties further includes a recessed slot extending between said opposite ends thereof, and behind said seat thereof for adjustably securing mounting rails thereto.

20. A frame according to claim 9 wherein said crotches are disposed only at said beams, and not at said cross ties.

21. A cabinet corner piece for rigidly joining a pair of beams and a cross tie to form a frame comprising:

a body having three pegs including a pair of pegs and a third peg diverging outwardly therefrom for being inserted in corresponding sockets in respective ends of said beams and cross tie;

a corner bezel integrally joined to said body, and extending in three orthogonal directions toward each of said three pegs to define a three dimensional outside corner; and three corner seats recessed in said body and bridging respective pairs of said pegs at a root of said bezel for receiving respective gaskets, and each of said corner seats faces outwardly along a corresponding orthogonal direction for adjoining corresponding recessed seats in said beams and cross tie.

22. A corner piece according to claim 21 wherein said corner seats are arcuate along said corner bezel.

23. A corner piece according to claim 22 wherein said corner bezel includes a raised land at respective ones of said three pegs for abutting said beams and cross tie to define respective gaps thereat.

24. A corner piece according to claim 23 further comprising a crotch disposed in said body and laterally separating said pair of pegs at an inside corner for engaging both said beams for welding thereto.

25. A corner piece according to claim 24 wherein said crotch extends obliquely between said peg pair for engaging said beams with an exposed land therebetween for integrally welding said beams thereto.

* * * * *